United States Patent
Gu et al.

(10) Patent No.: US 11,750,097 B2
(45) Date of Patent: *Sep. 5, 2023

(54) SWITCH-MODE AC-DC POWER CONVERTER FOR REDUCING COMMON MODE NOISE

(71) Applicant: Astec International Limited, Kowloon (HK)

(72) Inventors: Zhihua Gu, Kowloon (HK); Siu Chik Wong, Kowloon (HK); Kim Ly Kha, Kowloon (HK)

(73) Assignee: Astec International Limited, Kowloon (HK)

( * ) Notice: Subject to any disclaimer, the term of this patent is extended or adjusted under 35 U.S.C. 154(b) by 0 days.

This patent is subject to a terminal disclaimer.

(21) Appl. No.: 17/453,534

(22) Filed: Nov. 4, 2021

(65) Prior Publication Data

US 2022/0060112 A1 Feb. 24, 2022

Related U.S. Application Data

(63) Continuation of application No. 16/737,499, filed on Jan. 8, 2020, now Pat. No. 11,183,932.

(51) Int. Cl.
*H02M 3/158* (2006.01)
*H02M 1/12* (2006.01)
(Continued)

(52) U.S. Cl.
CPC ........... *H02M 3/158* (2013.01); *H02M 1/126* (2013.01); *H02M 7/219* (2013.01);
(Continued)

(58) Field of Classification Search
None
See application file for complete search history.

(56) References Cited

U.S. PATENT DOCUMENTS

| 9,252,654 B1 | 2/2016 | Tomioka |
| 10,050,443 B1 * | 8/2018 | Abdel-Rahman ..... H02M 7/217 |

(Continued)

FOREIGN PATENT DOCUMENTS

| TW | 201605163 | 2/2016 |
| WO | 2007006027 A1 | 11/2007 |

OTHER PUBLICATIONS

Zhang et al., EMI Prediction and Reduction of Zero0Crossing Noise in Totem-Pole Bridgeless PFC Converters, Journal of Power Electronics, vol. 19, No. 1, Jan. 2019, pp. 278-289.

*Primary Examiner* — Matthew V Nguyen

(57) ABSTRACT

A switch-mode AC-DC power converter includes a pair of input terminals, a pair of output terminals, and four switches coupled in a bridgeless totem-pole circuit arrangement between the pair of input terminals and the pair of output terminals. A control circuit is coupled to the four switches and configured to, during a cycle of an AC voltage input, turn on the first switch, turn off the second switch, and apply pulse-width modulation (PWM) control signals to the third and fourth switches. The control circuit is also configured to, during a zero crossing of the AC voltage input, supply a PWM control signal to the fourth switch to reduce a rate of voltage change across the second switch at the zero crossing to reduce common mode noise of the power converter.

20 Claims, 7 Drawing Sheets

(51) Int. Cl.
*H02M 7/219* (2006.01)
*H02M 1/00* (2006.01)
*H02M 7/48* (2007.01)

(52) U.S. Cl.
CPC .......... *H02M 1/0058* (2021.05); *H02M 1/123* (2021.05); *H02M 7/4815* (2021.05)

(56) References Cited

U.S. PATENT DOCUMENTS

| | | | |
|---|---|---|---|
| 10,461,628 B1* | 10/2019 | Wang | H02M 1/42 |
| 2006/0132231 A1 | 6/2006 | Ishii et al. | |
| 2014/0071724 A1 | 3/2014 | Chiba | |
| 2016/0141958 A1 | 5/2016 | Deng | |
| 2016/0308445 A1 | 10/2016 | King et al. | |
| 2017/0214314 A1* | 7/2017 | Jitaru | H02M 1/0085 |
| 2018/0375436 A1* | 12/2018 | Wagner | H02M 3/01 |
| 2020/0014296 A1* | 1/2020 | Guo | G01R 19/175 |
| 2022/0060112 A1* | 2/2022 | Gu | H02M 1/4216 |

* cited by examiner

SWITCH-MODE AC-DC POWER CONVERTER FOR REDUCING COMMON MODE NOISE

CROSS REFERENCE TO RELATED APPLICATIONS

This application claims benefit of and priority to U.S. application Ser. No. 16/737,499 filed Jan. 8, 2020. The entire disclosure of the above application is incorporated herein by reference.

FIELD

The present disclosure relates to switch-mode AC-DC power converters for reducing common mode noise.

BACKGROUND

This section provides background information related to the present disclosure which is not necessarily prior art.

In a totem-pole power factor correction (PFC) circuit, large voltage changes may occur across low frequency MOSFET switches at zero crossings of an AC voltage input. The large voltage changes induce common mode current that is due at least in part to charging and discharging of a capacitance between an output terminal of the circuit and an earth ground. The amplitude of the common mode current depends on a rate of change of the voltage across the low frequency MOSFET switches.

SUMMARY

This section provides a general summary of the disclosure, and is not a comprehensive disclosure of its full scope or all of its features.

According to one aspect of the present disclosure, a switch-mode AC-DC power converter includes a pair of input terminals for receiving an alternating current (AC) voltage input from a voltage source, a pair of output terminals for supplying a direct current (DC) voltage output to a load, and a first switch, a second switch, a third switch and a fourth switch coupled in a bridgeless totem-pole circuit arrangement between the pair of input terminals and the pair of output terminals. The converter also includes a control circuit coupled to the first switch, the second switch, the third switch and the fourth switch. The control circuit is configured to, during a cycle of the AC voltage input, turn on the first switch, turn off the second switch, and apply pulse-width modulation (PWM) control signals to the third and fourth switches. The control circuit is also configured to, during a zero crossing of the AC voltage input, supply a PWM control signal to the fourth switch to reduce a rate of voltage change across the second switch at the zero crossing to reduce common mode noise of the power converter.

According to another aspect of the present disclosure, a method of controlling a switch-mode AC-DC power converter is disclosed. The converter includes a pair of input terminals, a pair of output terminals, and a first switch, a second switch, a third switch and a fourth switch coupled in a bridgeless totem-pole circuit arrangement between the pair of input terminals and the pair of output terminals. The method includes receiving an AC voltage input at the first and second input terminals, and during a cycle of the AC voltage input, turning on the first switch, turning off the second switch, and applying pulse-width modulation (PWM) control signals to the third and fourth switches. The method also includes during a zero crossing of the AC voltage input, supplying a PWM control signal to the fourth switch to reduce a rate of voltage change across the second switch at the zero crossing to reduce common mode noise of the power converter.

According to another aspect of the present disclosure, a switch-mode AC-DC converter includes a switch-mode AC-DC power converter including a line input terminal and a neutral input terminal for receiving an alternating current (AC) voltage input from a voltage source, and a positive output terminal and a negative output terminal for supplying a direct current (DC) voltage output to a load. The converter also includes four switches arranged in a bridgeless totem-pole circuit between the input and output terminals where a first one of the four switches is coupled between the neutral input terminal and the positive output terminal, a second one of the four switches is coupled between the neutral input terminal and the negative output terminal, a third one of the four switches is coupled between the line input terminal and the positive output terminal, and a fourth one of the four switches is coupled between second input terminal and the second output terminal. The converter further includes a control circuit coupled to the first switch, the second switch, the third switch and the fourth switch, the control circuit configured to supply a PWM control signal to one of the four switches during a zero crossing of the AC voltage input to reduce a rate of voltage change across the said switch at the zero crossing to reduce common mode noise of the power converter.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Figure 1:
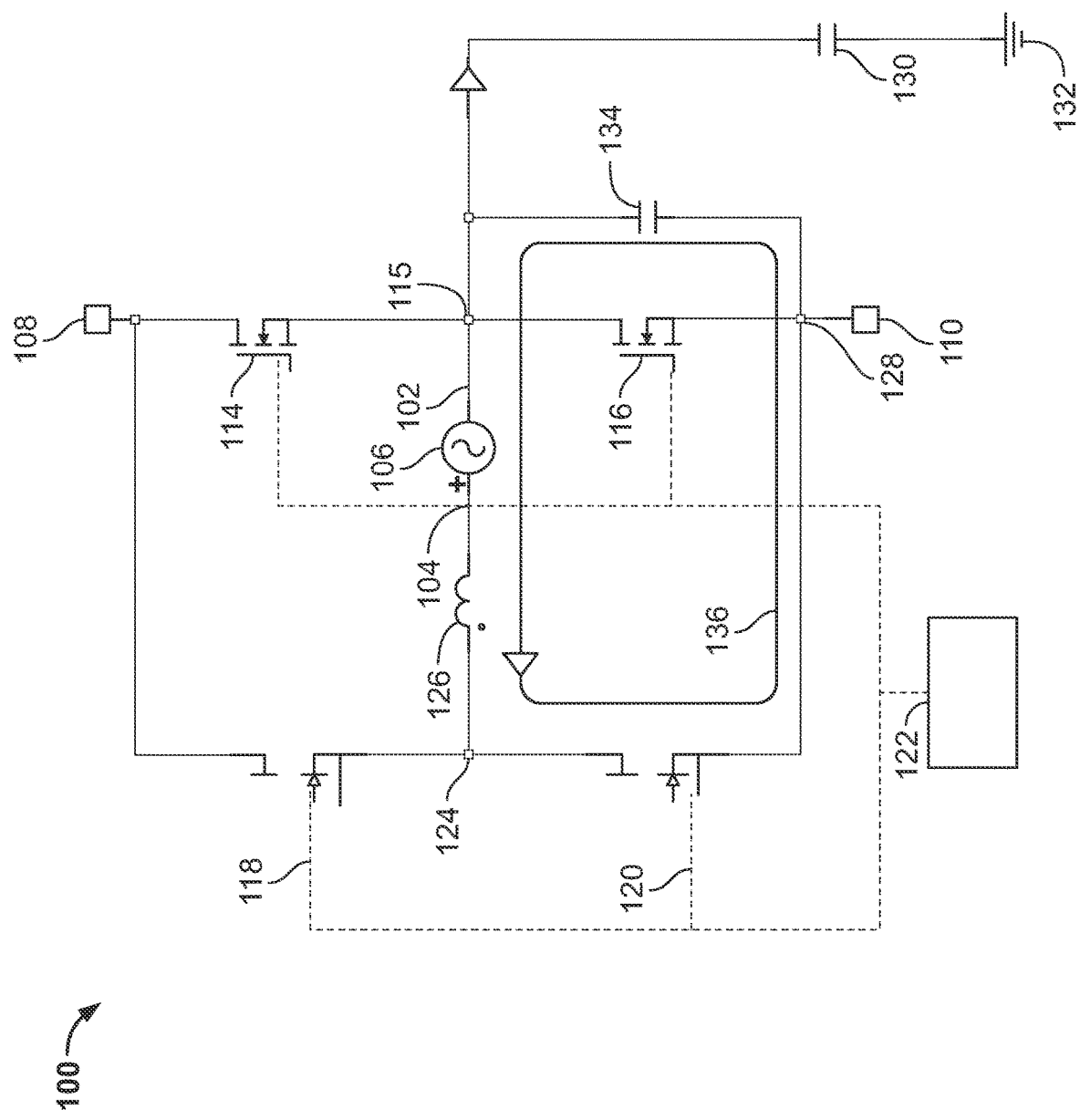
FIG. 1 is a circuit diagram of a switch-mode AC-DC power converter, according to one example embodiment of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then the oriented "above" the other elements or features. Thus, the example term "below" can encompass both an orientation of above and below. The device may be otherwise oriented (rotated 90 degrees or at other orientations) and the spatially relative descriptors used herein interpreted accordingly.

A switch-mode AC-DC converter according to one example embodiment of the present disclosure is illustrated in FIG. 1 and indicated generally by reference number 100. The switch-mode AC-DC power converter 100 includes a pair of input terminals 102 and 104 for receiving an alternating current (AC) voltage input from a voltage source 106, and a pair of output terminals 108 and 110 for supplying a direct current (DC) voltage output to a load (not shown in FIG. 1).

The converter 100 also includes a first switch 114, a second switch 116, a third switch 118 and a fourth switch 120 coupled in a bridgeless totem-pole circuit arrangement between the pair of input terminals 102 and 104, and the pair of output terminals 108 and 110. In some embodiments, the bridgeless totem-pole circuit may include a multi-phase totem-pole circuit, a multi-level totem-pole circuit, etc. The converter also includes a control circuit 122 coupled to the first switch 114, the second switch 116, the third switch 118 and the fourth switch 120.

The control circuit 122 is configured to, during a cycle of the AC voltage input, turn on the first switch 114, turn off the second switch 116, and apply pulse-width modulation (PWM) control signals to the third and fourth switches 118 and 120. The control circuit 122 is also configured to turn off the first switch 114 and the third switch 118 prior to a zero crossing of the AC voltage input. During the zero crossing of the AC voltage input, the control circuit 122 supplies a PWM control signal to the fourth switch 120 to reduce a rate of voltage change across the second switch 116 at the zero crossing to reduce common mode noise of the power converter 100.

The control circuit 122 is configured to stop supplying the PWM control signal to the fourth switch 120 after the zero crossing of the AC voltage input, and turn on the second switch 116 a specified time period after stopping the supply of the PWM control signal to the fourth switch 120.

For example, the specified time period may be any suitable time period for reducing a rate of voltage change across the second switch 116. For example, when the AC voltage input changes from a negative polarity to a positive polarity, the second switch 116 may be turned on before the drain-to-source voltage (Vds) of the second switch 116 exits a state of clamping to a value of the output voltage at the output terminal 110, such as a negative output voltage (VO−), etc.

When the AC voltage input changes from a positive polarity to a negative polarity, after stopping the supply of the PWM control signal to the third switch 118, the first switch 114 may be turned on before the Vds of the first switch 114 exits a state of clamping to a value of the output voltage at the output terminal 108, such as a positive output voltage (VO+), etc. In some embodiments, the specified time period may be greater than or equal to twenty microseconds, and less than or equal to forty microseconds, etc.

The cycle of the AC voltage input may be cycle where the AC voltage input has a negative polarity. During another cycle where the AC voltage input has a positive polarity (e.g., opposite the negative polarity of the first cycle), the control circuit 122 may be configured to turn on the second switch 116 and turn off the first switch 114. The control circuit 122 may apply PWM control signals to the third and fourth switches 118 and 120.

Prior to a zero crossing of the AC input voltage at an end of the positive polarity cycle, the control circuit 122 may be configured to turn off the second switch 116 and the fourth switch 120. During the zero crossing of the AC voltage input at the end of the positive polarity cycle, the control circuit may supply a PWM control signal to the third switch 118 to reduce a rate of voltage change across the first switch 114 during the zero crossing to reduce the common mode noise of the power converter 100.

In the bridgeless totem-pole circuit arrangement, the input terminal 102 may be a line input terminal (L) and the input terminal 104 may be a neutral input terminal. The output terminal 108 may be a positive output terminal (e.g., a Bulk+ terminal, a VO+ terminal, etc.), and the output terminal 110 may be a negative output terminal (e.g., a Bulk-terminal, a VO− terminal, etc.).

The first switch 114 is coupled between the input terminal 102 and the output terminal 108, and the second switch 116 is coupled between the input terminal 102 and the output terminal 110. The third switch 118 is coupled between the input terminal 104 and the output terminal 108, and the fourth switch 120 is coupled between input terminal 104 and the output terminal 110.

A circuit node 124 is defined between the third switch and the fourth switch, and the converter 100 may include an inductor 126 coupled between one of the input terminal 104 and the circuit node 124. A circuit node 128 is defined between the output terminals 110, the second switch 116 and the fourth switch 120. A capacitor 130 may be coupled between the circuit node 128 and an earth ground 132.

The switches 114, 116, 118 and 120 may comprise any suitable switching devices. For example, the first and second switches 114 and 116 may be metal-oxide semiconductor field-effect transistors (MOSFETs), and the third and fourth switches 118 and 120 may be gallium nitride (GaN) or silicon carbide (SiC) switching devices.

Each MOSFET 114 and 116 includes a capacitance across a Vds of the MOSFET. For example, the capacitance 134 across the Vds of the MOSFET 116 may include an output capacitance (Coss), parallel external capacitors, equivalent capacitance of other circuit(s) connected to the totem-pole circuit arrangement (e.g., a snubber network), etc.

The control circuit 122 may be configured to supply the PWM control signal to the fourth switch 120 during the zero crossing of the AC voltage input to reduce the rate of voltage change across the second MOSFET 116 by reducing a rate of discharge of the total capacitance 134 across the Vds of the second MOSFET 116 (e.g., via a discharge path 136). In some embodiments, a smoothing capacitor may be coupled in parallel with the output capacitance 134 to smooth a VDS transition of the MOSFET 116. The PWM control signal may comprise any suitable PWM signal, such as a high frequency signal having a fixed on time.

For example, the MOSFETs 114 and 116 may be low frequency switches of a totem pole PFC. During the positive cycle of the AC voltage input, the second switch 116 may be on and the first switch 114 may be off. During the negative cycle of the AC voltage input, the first switch 114 may be on while the second switch 116 is off.

At the zero crossing of negative to positive cycles of the AC voltage input, the neutral input terminal 102 may switch from a voltage of about 400V to a voltage of about 0V. At the zero crossing of positive to negative cycles of the AC voltage input, the neutral input terminal 102 may switch from about 0V to about 400V. Common mode current is induced due to the charging and discharging of the capacitor 130 (e.g. a Y-capacitor, a stray capacitor, etc.), between the output terminal 110 and the earth ground 132.

The amplitude of the common mode current may be dependent at least in part of a rate of change of the voltages (e.g., dVds/dt) across the MOSFETs 114 and 116. In order to reduce the rate of change of the voltages across the MOSFETs 114 and 116, the control circuit 122 may supply high frequency, fixed on-time pulses to the corresponding switches 118 and 120 to discharge the output capacitance 134 of the MOSFETs 114 and 116 during the corresponding zero crossings.

Figure 6:
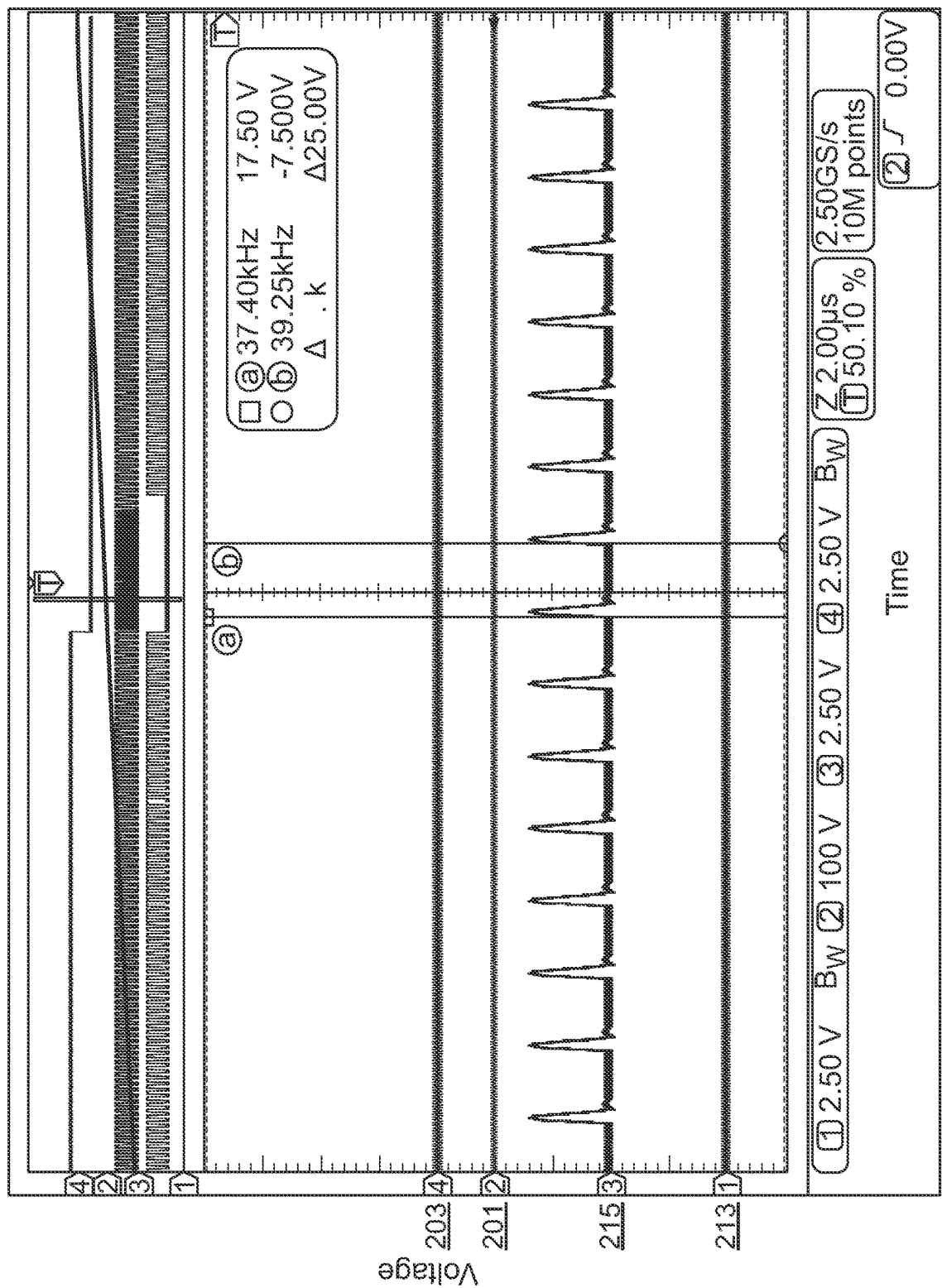
FIG. 6 is a graph of a further zoomed-in view of the example waveforms of FIG. 4, illustrating high frequency fixed on-time pulses.

The high frequency, fixed on-time pulses may use any suitable switching frequency for reducing the rate of change of the voltages across the MOSFETs 114 and 116. For example, the switching frequency may be greater than a resonance frequency at a node 115 between the first switch 114 and the second switch 116. Example waveforms herein, such as in FIG. 6, illustrate a pulse frequency of about 800 kilohertz (KHz). In other embodiments, higher or lower frequencies may be used. The control circuit 122 may then turn on the corresponding MOSFET 114 or 116 after the zero crossing, possibly with zero-voltage turn-on.

Figure 2:
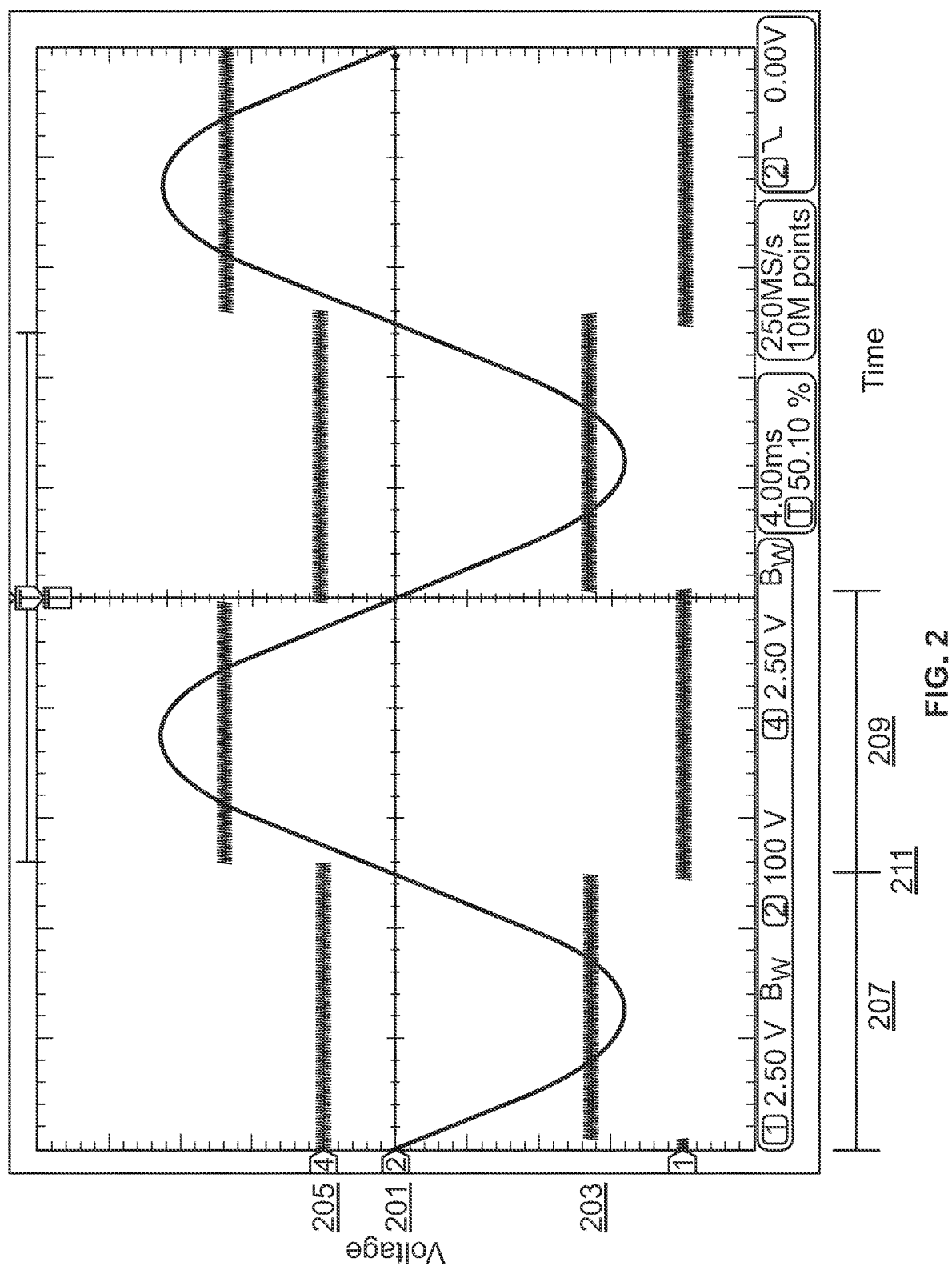
FIG. 2 is a graph of example waveforms of the AC voltage input and switch control signals of the converter of FIG. 1.

FIGS. 2-5 illustrate example voltage and current waveforms of various components of the converter 100 during positive cycles, negative cycles and zero crossings of the AC voltage input. As shown in FIG. 2, when the AC voltage input 201 is in a negative polarity cycle 207, the first switch 114 (e.g., a top MOSFET of the totem-pole arrangement) is on, and a control signal voltage 203 supplied to the first switch 114 (e.g., by the control circuit 122) is logically high. In contrast, the second switch 116 (e.g., a bottom MOSFET of the totem-pole arrangement) is off, and a control signal voltage 205 supplied to the second switch 116 (e.g., by the control circuit 122) is logically low.

When the AC voltage input 201 is in a positive polarity cycle 209, the first switch 114 is off, and the voltage 203 supplied to the first switch 114 is low. In contrast, the second switch 116 is on, and the voltage 205 supplied to the second switch 116 is high. At the zero crossing 211 of the AC voltage input 201, the first switch 114 turns off (e.g., the voltage 203 supplied to the first switch 114 goes from high to low), and the second switch 116 turns on (e.g., the voltage 205 supplied to the second switch 116 goes from low to high).

Figure 3:
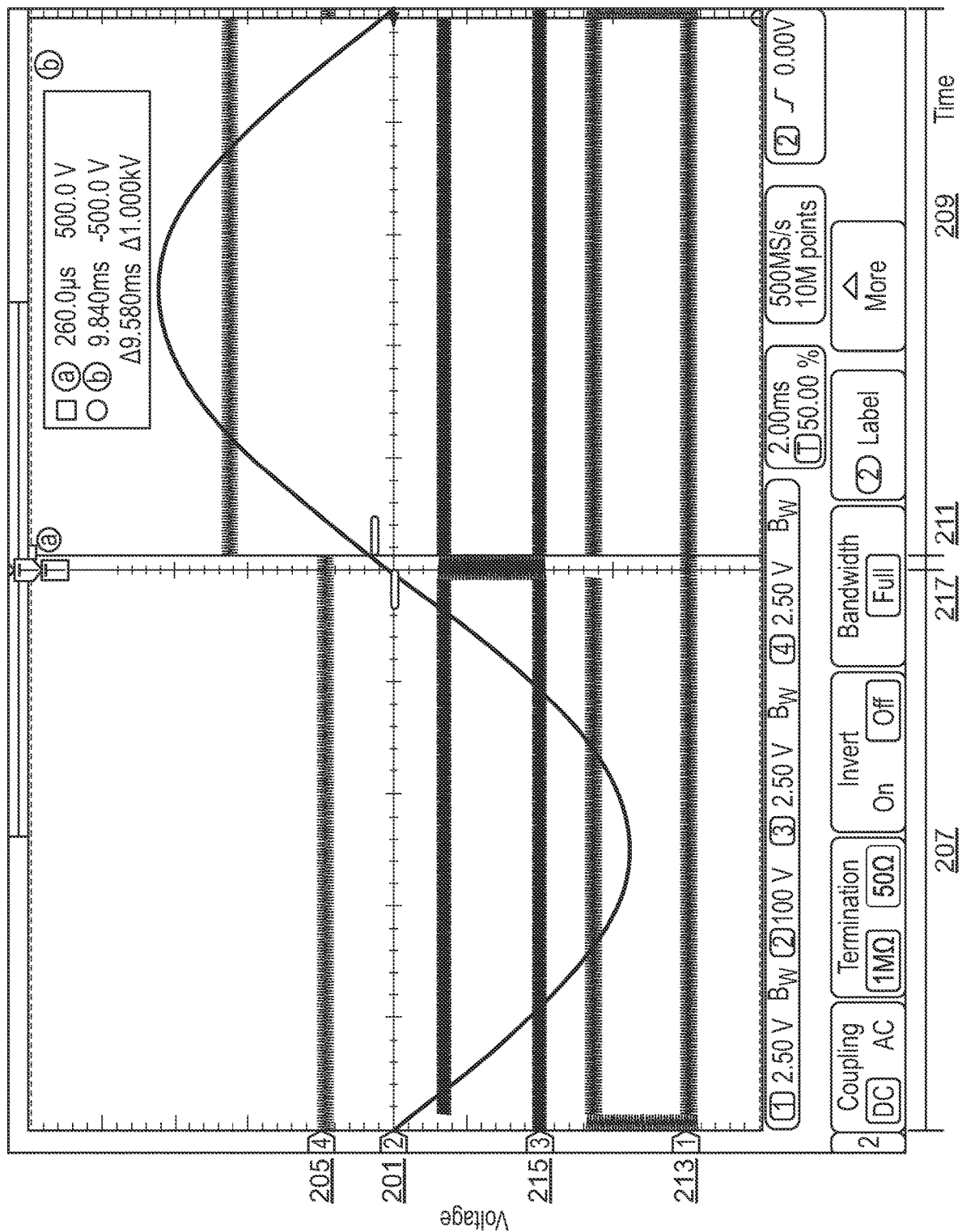
FIG. 3 is a graph of example waveforms of switch control signals for additional switches of the converter of FIG. 1.

FIG. 3 illustrates an example control signal voltage 213 supplied to the third switch 118 (e.g. a top SiC switch of the totem pole arrangement), and an example control signal voltage 215 supplied to the fourth switch 120 (e.g., a bottom SiC switch of the totem pole arrangement). The control signal voltages 213 and 215 may be supplied by the control circuit 122.

Figure 4:
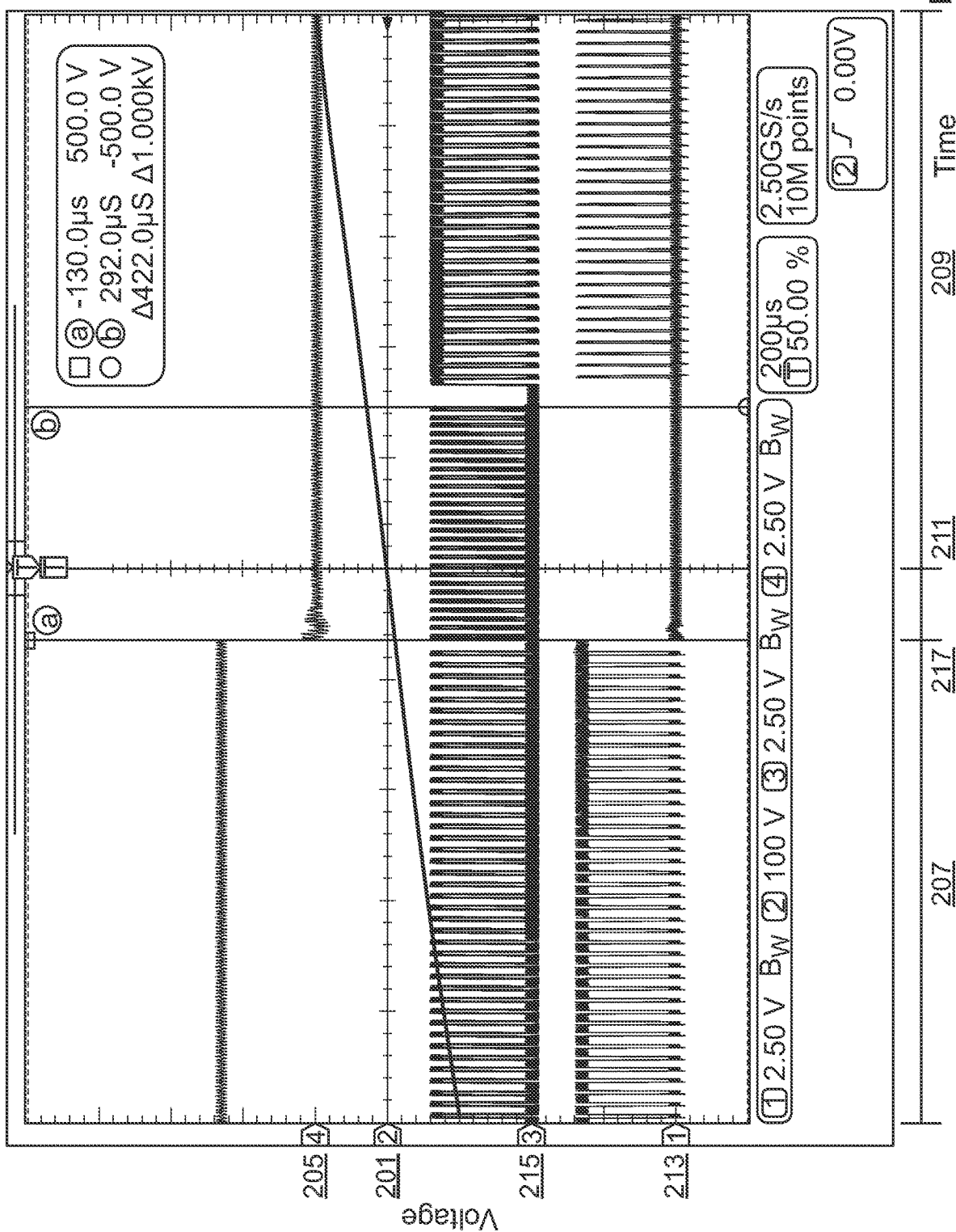
FIG. 4 is a graph including a zoomed-in view of the example waveforms of FIG. 3.
Figure 5:
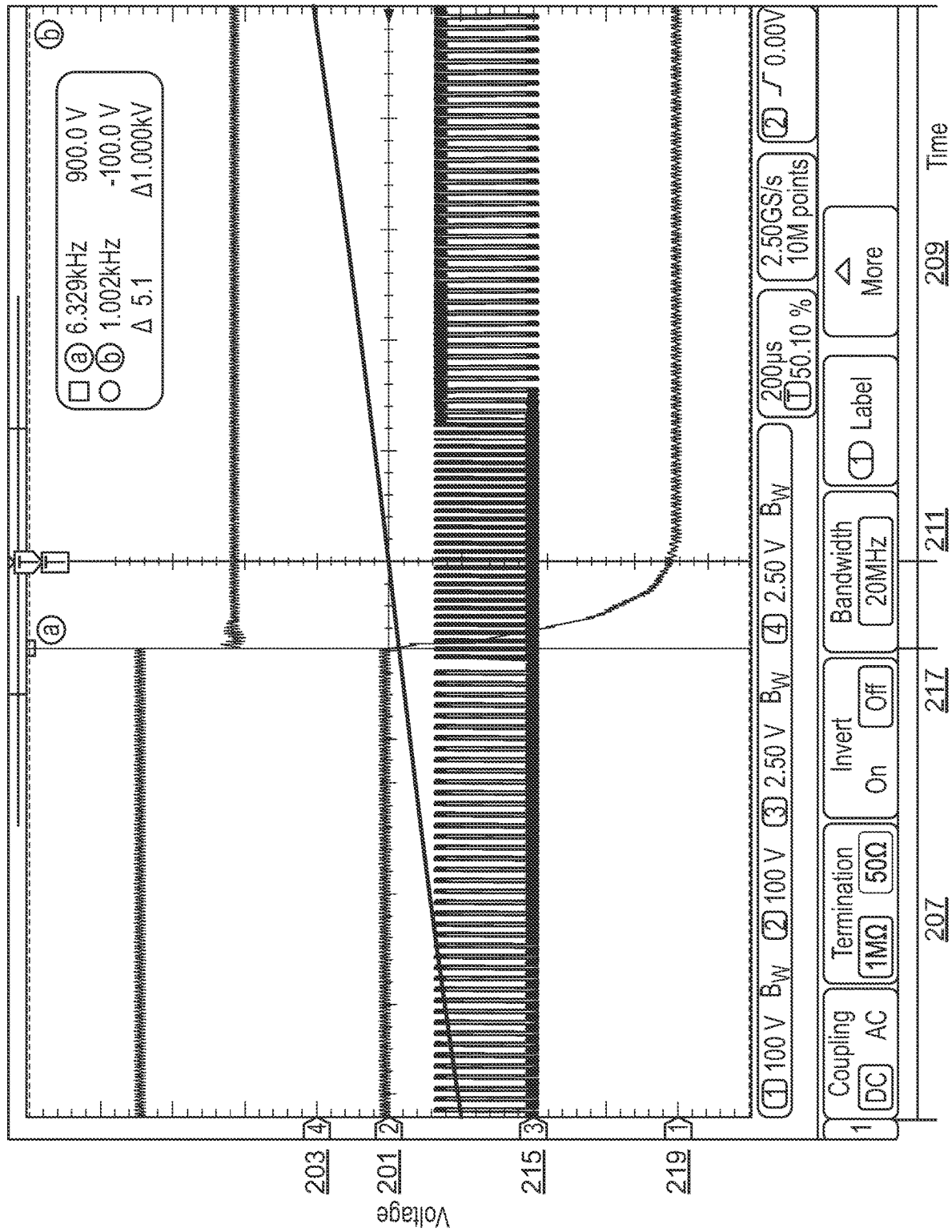
FIG. 5 is a graph including the example waveforms of FIG. 3, and further illustrating discharging of a capacitance of one of the switches of the converter of FIG. 1.

As shown in FIGS. 3-5, during the negative cycle 207 of the AC voltage input 201, the control signal voltage 213 operates the third switch 118 with a PWM signal, and the control signal voltage 215 operates the fourth switch 120 with a PWM signal (e.g., a bipolar PWM (BPWM) signal to operate the fourth switch 120 as an active diode in the totem pole arrangement). The control signal voltage 205 maintains the second switch 116 off.

Prior to the zero crossing of the AC voltage input 201, at a time 217, the control signal voltage 213 to the third switch 118 is stopped to turn off the third switch 118. The control signal voltage 215 to the fourth switch 120 changes from a BPWM signal to a high frequency signal with a fixed on-time (e.g., discharge pulses). This discharges a total capacitance 134 across a Vds of the second switch 116 (e.g., via a discharge path 136 through the fourth switch 120), to reduce a rate of voltage change across the second switch 116.

Although FIGS. 3-5 illustrate the third switch 118 as turning off prior to the zero crossing of the AC voltage input 201, in other embodiments the third switch could be turned off during or after the zero crossing of the AC voltage input 201 (e.g., in a range where an absolute value of the AC voltage input 201 is below a specified threshold, etc.).

For example, when the AC voltage input 201 falls below a specified threshold (e.g., about 30V absolute value), the third switch 118 may be turned off prior to the zero crossing of the AC voltage input 201. As another option, the third switch 118 may be turned off at the zero crossing of the AC voltage input 201, in response to a detection of a change in polarity of the AC voltage input 201. Further, the third switch 118 may be turned off after the zero crossing of the AC voltage input 201 when the AC voltage input 201 is still below a specified threshold (e.g., about 25V absolute value).

At the zero crossing 211, a drain-source voltage (VDS) 219 of each MOSFET 114 and 116 may change from 0V to 400V or vise-versa. The voltage between the output terminal 110 and the earth ground 132 may change at the same rate as the dVds/dt of the MOSFET 114 or 116. Common mode current is induced at least in part due to the charge and discharge of the capacitor 130. The high frequency pulses at the zero crossing 211 discharge the capacitance VDS 219 of the MOSFET 114 gradually, to slow down the dVds/dt and reduce the common mode.

FIG. 6 illustrates a zoomed-in view of the high frequency on time pulses 215 that are supplied to the fourth switch 120 at the zero crossing of the AC voltage input 201, in order to reduce the rate of voltage change across the second switch 116.

A specified time period after the zero crossing 211 of the AC voltage input 201 (e.g., between twenty to forty microseconds, etc.), the control signal voltage 205 turns on the second switch 116. The control signal voltage 213 applies a BPWM signal to the third switch 118 (e.g., to operate the third switch as an active diode in the totem pole arrangement), and the control signal voltage 215 applies a PWM signal to the fourth switch 120, during the positive polarity cycle 209 of the AC voltage input.

Figure 7:
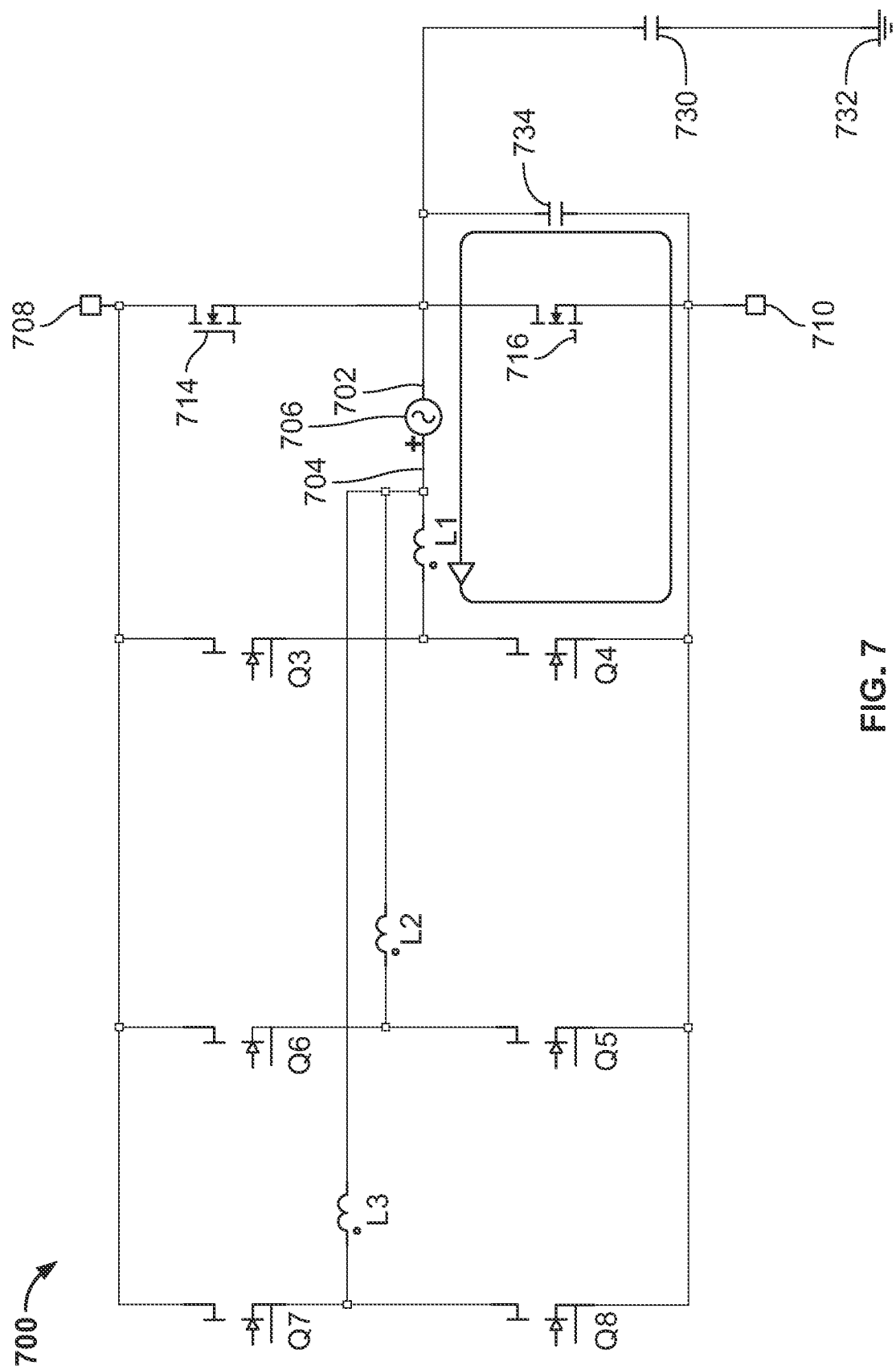
FIG. 7 is a circuit diagram of a multi-phase switch-mode AC-DC power converter, according to another example embodiment of the present disclosure.

For a multi-phase PFC, the high frequency pulses 215 may be applied to one phase at a time, to discharge the VDS capacitance of the corresponding MOSFET. For the other phases, the BPWM signal turns off before the zero crossing. A multi-phase switch-mode AC-DC converter according to another example embodiment of the present disclosure is illustrated in FIG. 7 and indicated generally by reference number 700. The multi-phase switch-mode AC-DC power converter 100 includes a pair of input terminals 702 and 704 for receiving an alternating current (AC) voltage input from a voltage source 706, and a pair of output terminals 708 and 710 for supplying a direct current (DC) voltage output to a load (not shown in FIG. 7).

The converter 700 includes a first switch 714 (e.g., a top MOSFET), and a second switch 716 (e.g., a bottom MOSFET). The converter 700 also includes N phases connected in parallel, each including a pair of switches (e.g., a pair of top and bottom SiC switches, etc.). Specifically, a first phase includes switches Q3 and Q4, a second phase includes switches Q5 and Q6, and an N-th phase includes switches Q7 and Q8. The switches Q3-Q8 are arranged in a multi-phase bridgeless totem-pole circuit arrangement.

A control circuit (not shown in FIG. 7) is configured to, during a zero crossing of the AC voltage input, supplies a PWM control signal to one of the bottom SiC switches Q4, Q5 and Q8, to reduce a rate of voltage change across the second switch 716 at the zero crossing to reduce common mode noise of the power converter 700 (e.g., by reducing a rate of discharge of an output capacitance 734 of the second switch 716).

The control circuit is configured to stop supplying the PWM control signal to the one of the bottom SiC switches Q4, Q5 and Q8 after the zero crossing of the AC voltage input, and turn on the second switch 716 a specified time period after stopping the supply of the PWM control to the one of the bottom SiC switches Q4, Q5 and Q8.

As shown in FIG. 7, the converter 700 may include three inductors L1, L2 and L3, each corresponding to a different phase of the converter 700. A capacitor 730 may be coupled between the input terminal 702 and an earth ground 732.

As described herein, the example power converters and control circuits may include a microprocessor, microcontroller, integrated circuit, digital signal processor, etc., which may include memory. The power converters and control circuits may be configured to perform (e.g., operable to perform, etc.) any of the example processes described herein using any suitable hardware and/or software implementation. For example, the power converters and controllers may execute computer-executable instructions stored in a memory, may include one or more logic gates, control circuitry, etc.

According to another aspect of the present disclosure, a method of controlling a switch-mode AC-DC power converter is disclosed. The converter includes a pair of input terminals, a pair of output terminals, and a first switch, a second switch, a third switch and a fourth switch coupled in a bridgeless totem-pole circuit arrangement between the pair of input terminals and the pair of output terminals.

The method includes receiving an AC voltage input at the first and second input terminals, and during a cycle of the AC voltage input, turning on the first switch, turning off the second switch, and applying pulse-width modulation (PWM) control signals to the third and fourth switches.

The method also includes turning off the first switch and the third switch prior to a zero crossing of the AC voltage input, and during the zero crossing of the AC voltage input, supplying a PWM control signal to the fourth switch to reduce a rate of voltage change across the second switch at the zero crossing to reduce common mode noise of the power converter.

The pair of input terminals may include a line input terminal and a neutral input terminal, and the pair of output terminals may include a positive output terminal and a negative output terminal. The first switch is coupled between the neutral input terminal and the positive output terminal, the second switch is coupled between the neutral input terminal and the negative output terminal, the third switch is coupled between the line input terminal and the positive output terminal, and the fourth switch is coupled between second input terminal and the second output terminal.

The method may include stopping supply of the PWM control signal to the fourth switch after the zero crossing of the AC voltage input, and turning on the second switch a specified time period after stopping the supply of the PWM control signal to the fourth switch. For example, the specified time period may be greater than or equal to twenty microseconds, may be less than or equal to forty microseconds, etc.

In some embodiments, the cycle of the AC voltage input is a first cycle having a first polarity, and the method further includes, during a second cycle of the AC voltage input having a second polarity opposite the first polarity, turning on the second switch and turn off the first switch. The method also includes, prior to a zero crossing of the AC input voltage at an end of the second cycle, turning off the second switch and the fourth switch, and during the zero crossing of the AC voltage input at the end of the second cycle, supplying a PWM control signal to the third switch to reduce a rate of voltage change across the first switch during the zero crossing to reduce the common mode noise of the power converter.

The switches may comprise any suitable switching devices. For example, the first and second switches may comprise metal-oxide semiconductor field-effect transistors (MOSFETs), and the third and fourth switches may comprise gallium nitride (GaN) or silicon carbide (SiC) switching devices.

Each MOSFET may include a total capacitance across a Vds of the MOSFET, and supplying the PWM control signal to the fourth switch during the zero crossing of the AC voltage input to reduce the rate of voltage change across the second MOSFET may include reducing a rate of discharge of a total capacitance across a Vds of the second MOSFET. The PWM control signal may include a high frequency control signal having a fixed on time.

The power converter may include a circuit node defined between the third switch and the fourth switch, and an inductor coupled between one of the input terminals and the circuit node. The converter may include a circuit node defined between one of the output terminals, the second switch and the fourth switch. A capacitor may be coupled between the circuit node and an earth ground.

According to another example embodiment of the present disclosure, a switch-mode AC-DC converter includes a switch-mode AC-DC power converter including a line input terminal and a neutral input terminal for receiving an alternating current (AC) voltage input from a voltage source, and a positive output terminal and a negative output terminal for supplying a direct current (DC) voltage output to a load.

The converter also includes four switches arranged in a bridgeless totem-pole circuit between the input and output terminals where a first one of the four switches is coupled between the neutral input terminal and the positive output terminal, a second one of the four switches is coupled between the neutral input terminal and the negative output terminal, a third one of the four switches is coupled between the line input terminal and the positive output terminal, and a fourth one of the four switches is coupled between second input terminal and the second output terminal.

The converter further includes a control circuit coupled to the first switch, the second switch, the third switch and the fourth switch, the control circuit configured to supply a PWM control signal to one of the four switches during a zero crossing of the AC voltage input to reduce a rate of voltage change across the said switch at the zero crossing to reduce common mode noise of the power converter.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A switch-mode AC-DC power converter comprising:
a bridgeless totem-pole circuit arrangement comprising a first switch, a second switch, a third switch, and a fourth switch; and
a control circuit coupled to the bridgeless totem-pole circuit arrangement;
wherein the control circuit is configured to:
during a cycle of an AC voltage input, turn on the first switch, turn off the second switch, and apply pulse-width modulation (PWM) control signals to the third and fourth switches;
prior to a zero crossing of the AC voltage input at an end of the cycle, turn off the first and third switches; and
during a zero crossing of the AC voltage input at the end of the cycle, supply a PWM control signal to the fourth switch to reduce a rate of voltage change across the second switch at the zero crossing to reduce common mode noise of the power converter.

2. The power converter of claim 1 further comprising:
a pair of input terminals coupled to the bridgeless totem-pole circuit arrangement and configured to receive the AC voltage input; and
a pair of output terminals coupled to the bridgeless totem-pole circuit arrangement and configured to supply a DC voltage output to a load.

3. The power converter of claim 2, wherein:
the pair of input terminals comprises a line input terminal and a neutral input terminal;
the pair of output terminals comprises a positive output terminal and a negative output terminal;
the first switch is coupled between the line input terminal and the positive output terminal;
the second switch is coupled between the line input terminal and the negative output terminal;
the third switch is coupled between the neutral input terminal and the positive output terminal; and
the fourth switch is coupled between the neutral input terminal and the negative output terminal.

4. The power converter of claim 1, wherein the control circuit is further configured to:
stop supplying the PWM control signal to the fourth switch after the zero crossing of the AC voltage input; and
turn on the second switch a specified time period after stopping the supply of the PWM control signal to the fourth switch.

5. The power converter of claim 4, wherein, in response to the AC voltage input changing from a negative polarity to a positive polarity, the control circuit is further configured to turn on the second switch before a drain-to-source voltage (Vds) of the second switch exits a state of clamping to a value of the voltage output at one of the pair of output terminals.

6. The power converter of claim 1, wherein the cycle of the AC voltage input is a first cycle having a first polarity, and the control circuit is further configured to:
during a second cycle of the AC voltage input having a second polarity opposite the first polarity, turn on the second switch, turn off the first switch, and apply PWM control signals to the third and fourth switches;
prior to a zero crossing of the AC input voltage at an end of the second cycle, turn off the second switch and the fourth switch; and
during the zero crossing of the AC voltage input at the end of the second cycle, supply a PWM control signal to the third switch to reduce a rate of voltage change across the first switch during the zero crossing to reduce the common mode noise of the power converter.

7. The power converter of claim 6, wherein the control circuit is further configured to:
stop supplying the PWM control signal to the third switch after the zero crossing of the AC voltage input; and
turn on the first switch a specified time period after stopping the supply of the PWM control signal to the third switch.

8. The power converter of claim 7, wherein, in response to the AC voltage input changing from a positive polarity to a negative polarity, the control circuit is further configured to, after stopping supply of the PWM control signal to the third switch, turn on the first switch before a Vds of the first switch exits a state of clamping to a value of the voltage output at the other one of the pair of output terminals.

9. The power converter of claim 1 further comprising:
a circuit node defined between the third switch and the fourth switch; and
an inductor coupled between one of the pair of input terminals and the circuit node.

10. The power converter of claim 1, wherein the first switch and the second switch comprise metal-oxide semiconductor field-effect transistors (MOSFETs).

11. The power converter of claim 10, wherein each MOSFET includes a total capacitance across a Vds of the MOSFET, and the control circuit is further configured to supply the PWM control signal to the fourth switch during the zero crossing of the AC voltage input to reduce the rate of voltage change across the second MOSFET by reducing a rate of discharge of the total capacitance across the Vds of the second MOSFET.

12. The power converter of claim 1 further comprising:
a circuit node defined between one of the output terminals, the second switch and the fourth switch;
an earth ground; and
a capacitor coupled between the circuit node and the earth ground.

13. The power converter of claim 1, wherein the third switch and the fourth switch comprise gallium nitride (GaN) or silicon carbide (SiC) switching devices.

14. The power converter of claim 1, wherein the PWM control signal comprises a PWM control signal having a fixed on time.

15. The power converter of claim 14, wherein a frequency of the PWM control signal is greater than a resonance frequency at a node between the first switch and the second switch.

16. A method of controlling a switch-mode AC-DC power converter including a bridgeless totem-pole circuit arrangement between a pair of input terminals and a pair of output terminals, the bridgeless totem-pole circuit arrangement comprising first, second, third, and fourth switches, the method comprising:
receiving an AC voltage input having a first polarity at the pair of input terminals;
during a first cycle of the AC voltage input, turning on the first switch, turning off the second switch, and applying pulse-width modulation (PWM) control signals to the third and fourth switches;
turning off the first and third switches prior to a zero crossing of the AC voltage input at an end of the first cycle; and
during a zero crossing of the AC voltage input at the end of the cycle, supplying a PWM control signal to the fourth switch to reduce a rate of voltage change across the second switch at the zero crossing to reduce common mode noise of the power converter.

17. The method of claim 16 further comprising:
stopping supply of the PWM control signal to the fourth switch after the zero crossing of the AC voltage input at the end of the first cycle; and
turning on the second switch a specified time period after stopping the supply of the PWM control signal to the fourth switch.

18. The method of claim 17, wherein, in response to the AC voltage input changing from a negative polarity to a positive polarity at the end of the first cycle, turning on the second switch comprises turning on the second switch before a drain-to-source voltage (Vds) of the second switch exits a state of clamping to a value of the voltage output at one of the pair of output terminals.

19. The method of claim 16 further comprising:
during a second cycle of the AC voltage input having a second polarity opposite the first polarity, turning on the second switch and turning off the first switch and applying PWM control signals to the third and fourth switches;
turning off the second and fourth switches prior to a zero crossing of the AC input voltage at an end of the second cycle; and
during the zero crossing of the AC voltage input at the end of the second cycle, supplying a PWM control signal to the third switch to reduce a rate of voltage change across the first switch during the zero crossing to reduce the common mode noise of the power converter.

20. The method of claim 19 further comprising:
stopping supply of the PWM control signal to the third switch after the zero crossing of the AC input voltage at the end of the second cycle; and
in response to the AC voltage input changing from a positive polarity to a negative polarity at the end of the second cycle, turning on the first switch before a Vds of the first switch exits a state of clamping to a value of the voltage output at the other one of the pair of output terminals.

* * * * *